United States Patent [19]

Horio et al.

[11] Patent Number: 4,814,876
[45] Date of Patent: Mar. 21, 1989

[54] ELECTRONIC CAMERA

[75] Inventors: Motohiko Horio; Naoki Kobayashi; Kouji Kaneko, all of Saitama, Japan

[73] Assignee: Fuji Photo Optical Co., Ltd., Japan

[21] Appl. No.: 721,435

[22] Filed: Apr. 9, 1985

[30] Foreign Application Priority Data

May 28, 1984 [JP] Japan ................................ 59-107900

[51] Int. Cl.⁴ .............................................. H04N 5/14
[52] U.S. Cl. ..................................... 358/160; 358/906
[58] Field of Search ............ 358/209, 160, 244, 244.1, 358/244.2, 217, 909, 229, 224, 335, 906, 310; 360/9.1, 10.1, 10.3, 33.1

[56] References Cited

U.S. PATENT DOCUMENTS

| | | | |
|---|---|---|---|
| 3,555,177 | 1/1971 | Tyler | 358/244.2 |
| 4,389,675 | 6/1983 | Suzuki et al. | 358/229 |
| 4,409,619 | 10/1983 | Takubo et al. | 358/229 |
| 4,470,077 | 9/1984 | Komine | 358/229 |
| 4,475,131 | 10/1984 | Nishizawa et al. | 360/9.1 |
| 4,489,351 | 12/1984 | d'Alayer de Costemore d'Arc | 358/209 |
| 4,507,689 | 3/1985 | Kozuki et al. | 360/33.1 |
| 4,527,205 | 7/1985 | Konishi | 358/335 |
| 4,531,164 | 7/1985 | Maeda et al. | 360/33.1 |
| 4,571,627 | 2/1986 | Stempeck | 358/224 |
| 4,589,031 | 5/1986 | Tsugi | 358/224 |
| 4,591,254 | 5/1986 | Sokolowski | 358/224 |
| 4,604,668 | 8/1986 | Lemelson | 360/10.1 |
| 4,746,990 | 5/1988 | Katoh et al. | 358/310 |

FOREIGN PATENT DOCUMENTS 0181283 11/1982 Japan ................................ 358/909

Primary Examiner—James J. Groody
Assistant Examiner—David E. Harvey

[57] ABSTRACT

An electronic camera includes an electronic camera unit for generating a still image signal, an encoder for converting the still image signal from the electronic camera unit into a television signal and for issuing the television signal through an output terminal to a video recorder, and an electronic viewfinder for displaying the television signal as a visible image. The encoder and the electronic viewfinder are contained in an adapter detachably connected to the electronic camera unit. The television signal from the encoder is applied directly to a video circuit in the video viewfinder, and also delivered through a connector or a coupling terminal to the video recorder.

1 Claim, 2 Drawing Sheets

ELECTRONIC CAMERA

BACKGROUND OF THE INVENTION

1. Field of the Invention

The present invention relates to an electronic camera having a solid-state imaging device for converting the image of a photographed object into an image signal and delivering the image signal to an image signal recording device.

2. Description of the Prior Art

The rapid progress of electronics in recent years has promoted the development of electronic cameras in which still images are photographed by a solid-state imaging device such as a CCD image sensor and recorded on a magnetic disk. Such electronic cameras have already been marketed. The electronic camera is composed of a photographing optical system, a solid-state imaging device, such as a CCD image sensor or a MOS image sensor, for converting an object image focused by the optical system into an image signal, a chrominance signal separating circuit for separating the image signal into R, G, B chrominance signals, a matrix circuit, an output unit, and other components. The electronic camera is normally used in combination with a still image recorder employing a magnetic disk as a recording medium. In such an application, the electronic camera issues image signals (generally, color-difference signals R - Y, B - Y, and Y, and a synchronizing signal) which can be recorded on the recording medium in the still image recorder.

With the various information media available today, there is a strong demand for the ability to photograph and record moving images and hence for devices such as video recorders for photographing and recording moving images. It would be very convenient for users if moving images as well as still images could be recorded or reproduced in the form of image signals issued from the electronic camera.

However, the electronic camera of the abovementioned design can produce still image signals only, and is unable to record moving-image signals on a conventional video recorder. In addition, even if the electronic viewfinder on a video camera is coupled to the electronic camera, no reproduced image can be displayed through the viewfinder.

SUMMARY OF THE INVENTION

In view of the aforesaid drawbacks of the prior electronic cameras, it is an object of the present invention to provide an electronic camera for photographing still images, which is capable of recording moving-image signals on a video recorder and also of displaying reproduced images on an electronic viewfinder.

According to the present invention, an electronic camera comprises an electronic camera unit for generating a still image signal, an encoder for converting the still image signal from the electronic camera unit into a television signal and for issuing the television signal through an output terminal to a video recorder, and an electronic viewfinder for displaying the television signal as a visible image. The encoder and the electronic viewfinder may be contained in an adapter. With this adapter, the television signal from the encoder is applied directly to a video circuit in the video viewfinder, and also delivered through a connector or a coupling terminal to the video recorder. The adapter is detachably connected to the electronic camera unit.

With the electronic camera of the present invention, because the image signal representing the image of a photographed object is converted into the television signal by the encoder outside of the electronic camera unit, moving-image signals can be recorded on a recording medium when the electronic camera unit with the encoder is coupled to a conventional video recorder having no encoder. The electronic viewfinder can display reproduced images. The electronic camera can therefore record and reproduce moving images as well as still images. Consequently, the electronic camera unit which has been used for photographing and recording still images in combination with a still image recorder can also be used for photographing moving images. The user can therefore photograph still images or moving images with the same electronic camera.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
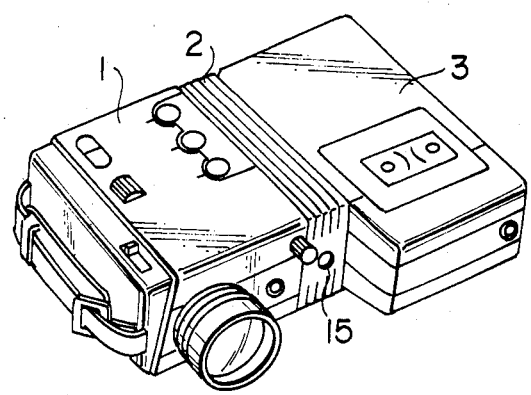
FIG. 1 is a perspective view of an electronic camera according to an embodiment of the present invention.

FIG. 1 illustrates an electronic camera system composed of an electronic camera unit 1, an adapter 2 detachably coupled to the electronic camera unit 1, and an 8-mm video recorder 3 detachably coupled to the adapter 2.

Figure 2:
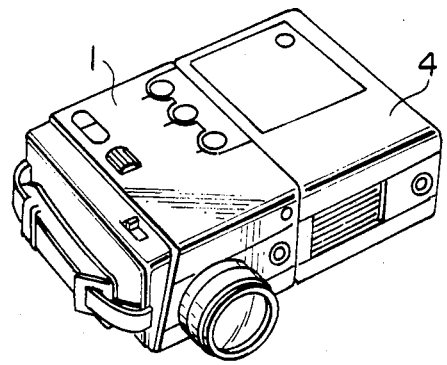
FIG. 2 is a perspective view of a system composed of the electronic camera unit of the electronic camera shown in FIG. 1 and a still image recorder.

As shown in FIG. 2, the electronic camera unit 1 is normally combined with a still image recorder 4 employing a magnetic disk as a recording medium, thus providing a system for photographing and recording still images.

The adapter 2 includes an encoder 12 (FIG. 3) for converting image signals into NTSC television signals, and an electronic viewfinder 14 with a small-size CRT, which is of the type ordinarily employed as a viewfinder or a monitor on a video camera or the like. The 8-mm video recorder 3 is supplied with NTSC television signals for recording these television signals on an 8-mm video tape inserted as a recording medium. The electronic camera unit 1 and the adapter 2, and the adapter 2 and the 8-mm video recorder 3 are electrically interconnected by electric connectors (not shown) for signal transmission.

Figure 3:
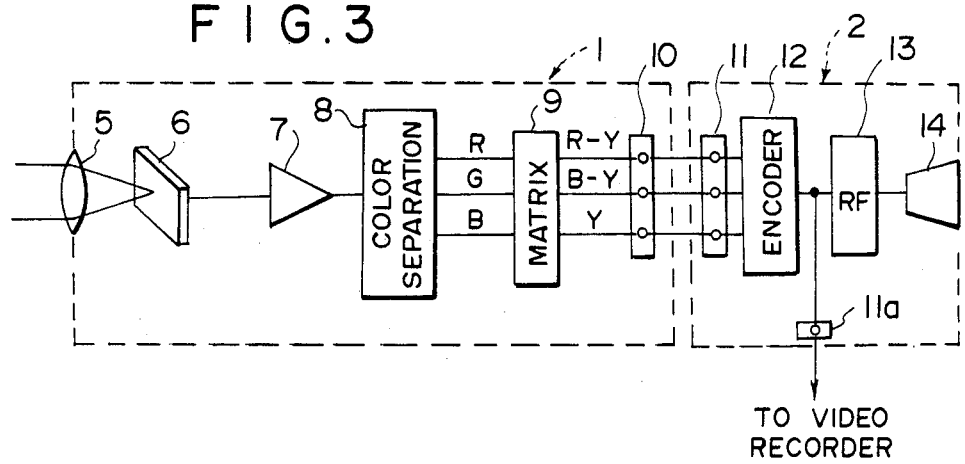
FIG. 3 is a block diagram of the circuit arrangements of the electronic camera unit and an adapter illustrated in FIG. 1.

The flow of signals to be recorded in the system shown in FIG. 1 will be described with reference to the block diagram of FIG. 3. In the electronic camera unit 1, the image of an object being photographed is focused by a photographing optical system 5 onto a solid-state imaging device 6 such for example as a CCD image sensor or a MOS image sensor. The image is then converted by the solid-state imaging device into a digital image signal which is serially delivered to an amplifier 7. The digital image signal is amplified by the amplifier 7, and then separated by a color separating circuit 8 into R, G, B chrominance signals that are converted by a matrix circuit 9 into color-difference signals R - Y, B - Y, and Y. These color-difference signals are delivered out of the electronic camera unit 1 through a connector 10 into the adapter 2 through a connector 11. The encoder 12 in the adapter 2 adds a vertical synchronizing signal, a horizontal synchronizing signal, and a color synchronizing signal to the color-difference signals to produce an NTSC television signal which is then transmitted through a connector 11a to the 8-mm video recorder 3.

The NTSC television signal from the encoder 12 is converted by an RF converter 13 into an RF signal applied to the electronic viewfinder 14 which displays the image of the object on its CRT. The encoder 12 is arranged to issue a one-frame television signal every 1/30 second, so that the CRT in the electronic viewfinder displays 30 image frames per 1 second, thus allowing the viewer to monitor the photographed object continuously.

Figure 4:
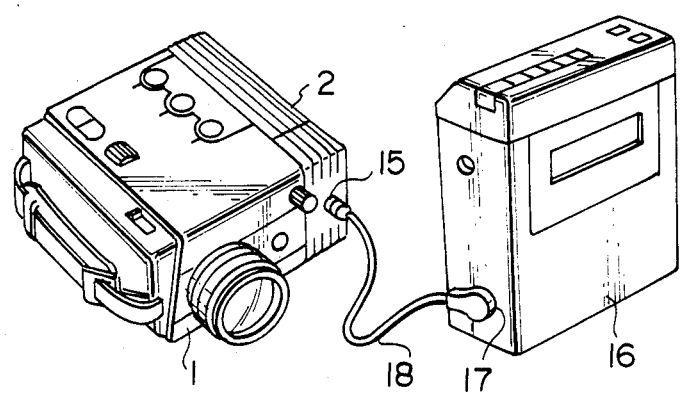
FIGS. 4, 5, and 6 are perspective views of various combinations of the electronic camera unit of FIG. 1 and other recorders.

Since the 8-mm video recorder 3 in FIG. 1 is detachable from the adapter 2, the 8-mm video recorder 3 may be disconnected from the adapter 2, and an ordinary VTR 16 may be connected to the adapter 2, as shown in FIG. 4, by a signal cable 18 coupled to a television signal output terminal 15 on the front panel of the adapter 2 and a television signal input terminal 17 of the VTR 16. The television signal output terminal 15 is electrically connected to the output stage of the encoder 12 to issue the same television signal as that delivered through the output terminal 11a (see FIG. 3).

The electronic camera unit 1 and the adapter 2 are separable from each other as described above. When images photographed by the electronic camera unit 1 are to be recorded as still images, the adapter 2 is detached from the electronic camera unit 1, and then the still image recorder 4 is joined to the electronic camera unit 1 through the electronic connector for signal transmission therebetween, as illustrated in FIG. 2.

Figure 5:
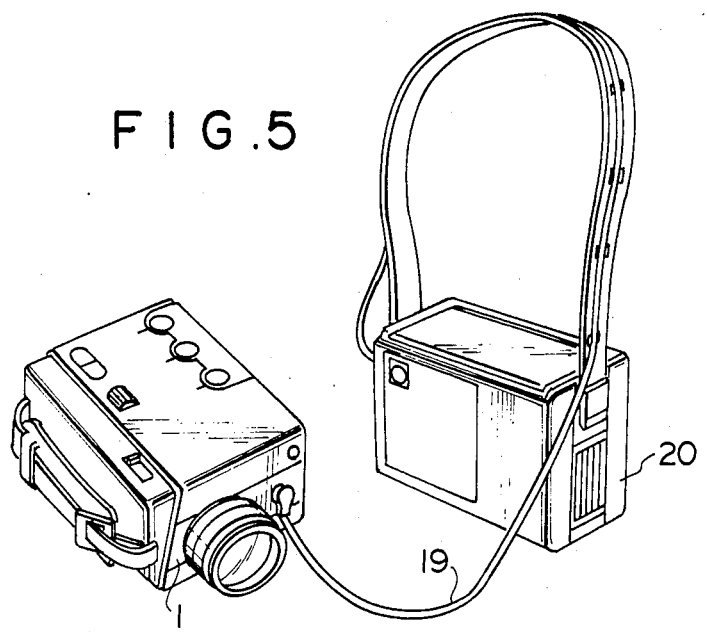

Alternatively, as shown in FIG. 5, a still image recorder 20 may be coupled to the electronic camera unit 1 by a signal cable 19.

Figure 6:
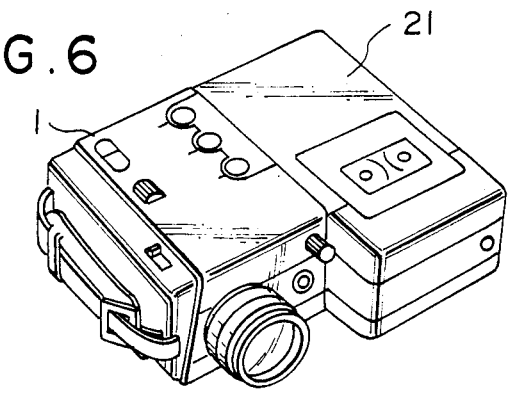

The electronic camera unit 1 may also be coupled to an 8-mm video recorder 21 with a built-in NTSC encoder, as shown in FIG. 6.

While in the illustrated embodiment the encoder 12 and the electronic viewfinder 14 are contained in the adapter 2, they may be housed in independent housings. The encoder 12 described above produces NTSC television signals. However, an encoder for producing PAL or SECAM television signals may be employed in place of the encoder 12.

Although a certain preferred embodiment has been shown and described, it should be understood that many changes and modifications may be made therein without departing from the scope of the appended claims.

We claim:
1. An electronic camera comprising:
  (i) an electronic camera unit composed of a photographing optical system, a solid-state imaging device for converting the image of an object focused by said photographing system into an image signal, and an output circuit for issuing the image signal as a still image signal;
  (ii) an adapter unit for converting said still image signal into a television signal and for issuing said television signal through an output terminal, said adapter unit including an encoder for converting the still image signal issued from said electronic camera unit into a television signal, said encoder having an output terminal for delivering out said television signal, said adapter unit further including an electronic viewfinder mounted therein for displaying said television signal as a visible image, said encoder and said electronic viewfinder being contained in said adapter unit, means on said electronic camera unit and on said adapter unit for detachably connecting said adapter unit to said electronic camera unit, and connector means for detachably connecting said encoder output terminal to an auxiliary device such as a VTR, or the like which is separate from said adapter unit.

* * * * *